(12) United States Patent
Johnson et al.

(10) Patent No.: US 9,085,317 B2
(45) Date of Patent: Jul. 21, 2015

(54) SYSTEMS AND METHODS FOR VARIABLE STEERING ASSIST

(71) Applicant: GM GLOBAL TECHNOLOGY OPERATIONS LLC, Detroit, MI (US)

(72) Inventors: Terrel D. Johnson, West Bloomfield, MI (US); John T. Zuzelski, Clarkston, MI (US); Tadge J. Juechter, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 75 days.

(21) Appl. No.: 13/944,258

(22) Filed: Jul. 17, 2013

(65) Prior Publication Data

US 2015/0025742 A1    Jan. 22, 2015

(51) Int. Cl.
*B62D 5/04* (2006.01)
*B62D 15/02* (2006.01)

(52) U.S. Cl.
CPC ............ *B62D 5/0469* (2013.01); *B62D 15/021* (2013.01)

(58) Field of Classification Search
CPC ............................. B62D 5/0469; B62D 15/021
USPC .......................................................... 701/41
See application file for complete search history.

(56) References Cited

U.S. PATENT DOCUMENTS

| | | | |
|---|---|---|---|
| 6,838,846 B2 * | 1/2005 | Matsuoka | 318/432 |
| 6,843,344 B2 * | 1/2005 | Kodama et al. | 180/446 |
| 6,915,194 B2 * | 7/2005 | Kodama et al. | 701/41 |
| 8,504,246 B2 | 8/2013 | Christiansen et al. | |
| 2005/0279562 A1 * | 12/2005 | Hara et al. | 180/402 |
| 2006/0011404 A1 * | 1/2006 | Goto et al. | 180/402 |
| 2008/0162001 A1 * | 7/2008 | Chai et al. | 701/42 |
| 2009/0078494 A1 * | 3/2009 | Dornhege et al. | 180/446 |
| 2012/0221206 A1 * | 8/2012 | Christiansen et al. | 701/41 |

* cited by examiner

*Primary Examiner* — Mary Cheung
*Assistant Examiner* — Frederick Brushaber
(74) *Attorney, Agent, or Firm* — Ingrassia Fisher & Lorenz, P.C.

(57) ABSTRACT

Methods and apparatus are provided for controlling a steering assist unit of a vehicle. The method includes receiving sensor data indicating a wheel position of a wheel relative to a frame of the vehicle, and determining a travel limit value for the steering assist unit based at least on the wheel position of the wheel. The method further includes outputting a control signal to control the travel of the steering assist unit based on the travel limit value.

11 Claims, 2 Drawing Sheets

SYSTEMS AND METHODS FOR VARIABLE STEERING ASSIST

TECHNICAL FIELD

The present disclosure generally relates to steering systems for vehicles and more particularly relates to systems and methods for variable steering assist in a motor vehicle.

BACKGROUND

Steering systems generally assist the operator of the vehicle in maneuvering the vehicle during use. Generally, steering systems have a steering assist unit, such as a rack and pinion mechanism, which can have a fixed range of travel. In certain driving conditions, however, it may be desirable to have a greater range of travel for the steering system, such as when parking the vehicle. However, having a greater range of travel may be undesirable when the vehicle is traveling over uneven surfaces.

Accordingly, it is desirable to provide systems and methods for variable steering assist during the operation of the vehicle. Furthermore, other desirable features and characteristics of the present invention will become apparent from the subsequent detailed description and the appended claims, taken in conjunction with the accompanying drawings and the foregoing technical field and background.

SUMMARY

A method is provided for controlling a steering assist unit of a vehicle. The method includes receiving sensor data indicating a wheel position of a wheel relative to a frame of the vehicle, and determining a travel limit value for the steering assist unit based at least on the wheel position of the wheel. The method further includes outputting a control signal to control the travel of the steering assist unit based on the travel limit value.

An apparatus is provided for a steering assist unit control system for a vehicle. The apparatus includes a steering assist unit having a path of travel. The apparatus further includes a steering assist control module that determines a travel limit value for the steering assist unit based on a speed of the vehicle and a wheel position of a wheel of the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
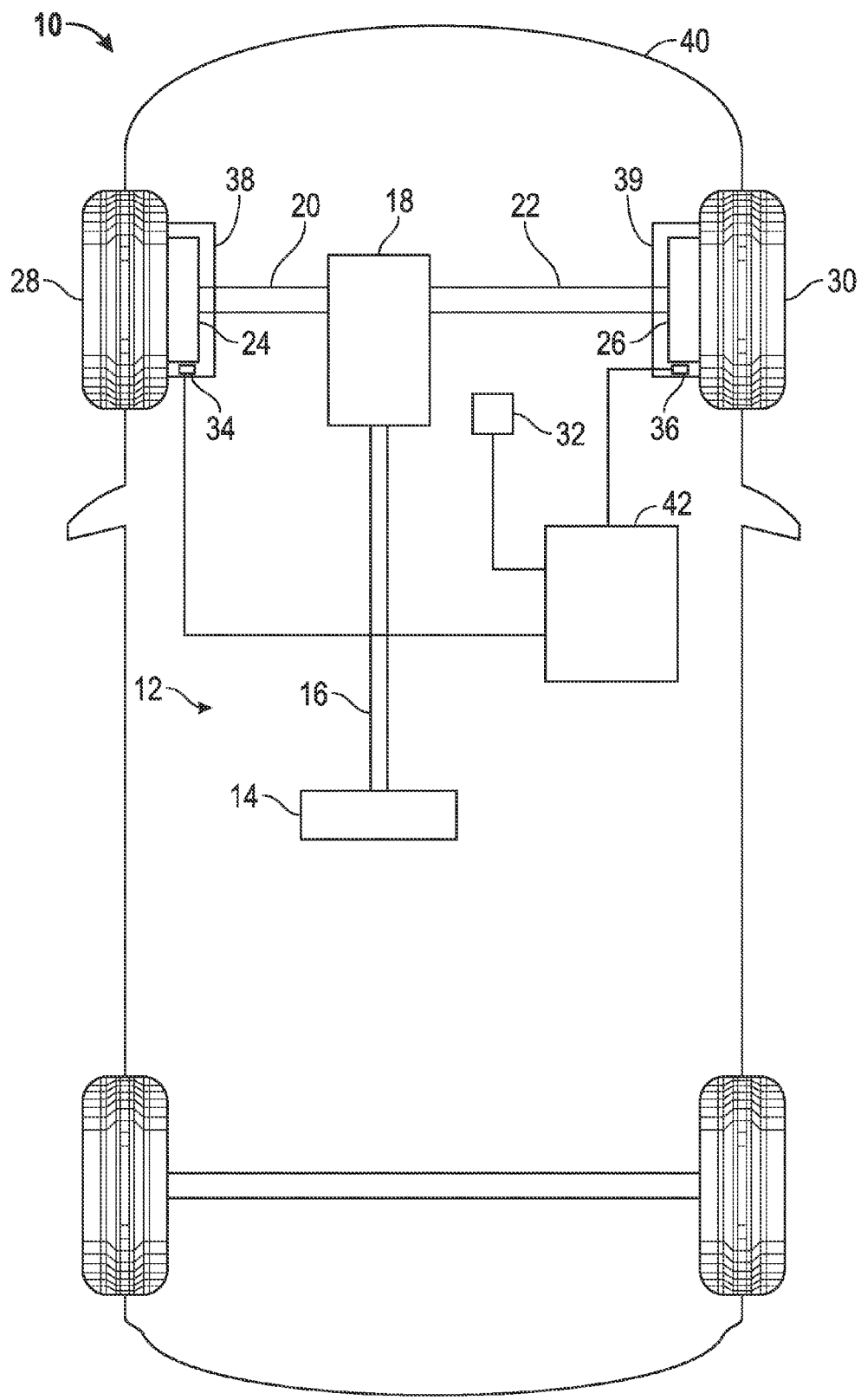
FIG. 1 is a functional block diagram illustrating a vehicle that includes a steering system in accordance with various embodiments.

With reference to FIG. 1, a vehicle 10 is shown having a steering system 12 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 32, 34, 36 that observe conditions of the steering system 12 and/or of the vehicle 10 and generate sensor signals based the observed conditions. In various embodiments, the sensor 32 is a vehicle speed sensor, the sensor 34 is a first wheel position sensor associated with the wheel 28 and the sensor 36 is a second wheel position sensor associated with the wheel 30. It should be noted that the sensors 32, 34, 36 are merely exemplary, as any number of sensors could be employed and further, one or more of the conditions measured by the sensors 32, 34, 36 can be derived from other sources, such as by modeling, for example. It should also be noted that the vehicle 10 can include various other sensors that detect and measure observable conditions of the steering system 12 and/or of the vehicle 10, including, but not limited to a yaw angle sensor and a hand wheel angle sensor.

In one example, the sensors 34, 36 are associated with a suspension system 38, 39 of the vehicle 10. As a further example, the sensors 34, 36 are associated with a magneto-rheological active shock suspension system, which is in turn associated with each of the wheels 28, 30. Generally, each of the sensors 34, 36 detect and measure a position of the respective wheel 28, 30 relative to a frame 40 of the vehicle 10. It should be noted, however, that the sensors 34, 36 can be independent wheel position sensors, if desired.

In various embodiments, a control module 42 controls the operation of the steering system 12 and/or the vehicle 10 based on one or more of the sensor signals and further based on the steering control systems and methods of the present disclosure. Generally speaking, the steering control systems and methods of the present disclosure determine a range of travel for the steering assist unit 18. In one example, the steering control systems and methods of the present disclosure determine a range of travel for a rack of the steering assist unit 18 based on the vehicle speed (e.g., from the vehicle speed sensor 32) and the wheel position (e.g., from the wheel position sensor 34, 36). According to various embodiments, the control module 42 increases the amount of travel the steering assist unit 18 can move the tie rods, 20, 22 if the vehicle is below a predetermined speed and the wheel position is within acceptable limits. Conversely, the control module 42 decreases the amount of travel the the steering assist unit 18 can move the tie rods 20, 22 if the vehicle is above the predetermined speed or below the predetermined speed and the wheel position is outside of acceptable limits. It should be noted that the control module 42 is in communication with the sensors 34, 36 and steering assist unit 18 over a suitable communication architecture, such as a data bus, associated with the vehicle 10.

Figure 2:
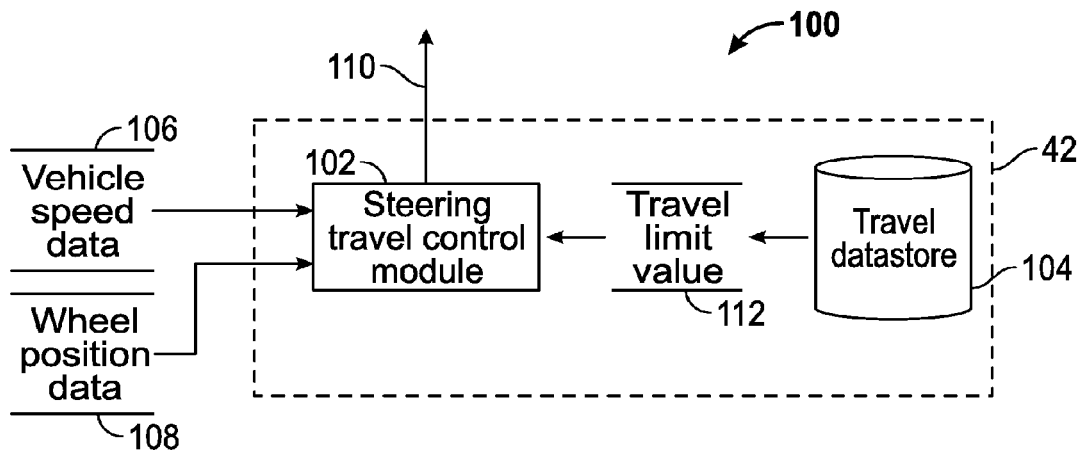
FIG. 2 is a dataflow diagram illustrating a control system of the steering system in accordance with various embodiments.

Referring now to FIG. 2, and with continued reference to FIG. 1, a dataflow diagram illustrates various embodiments of a steering control system 100 for the steering system (FIG. 1) that may be embedded within the control module 42. Various embodiments of the steering control system according to the present disclosure can include any number of sub-modules embedded within the control module 42. As can be appreciated, the sub-modules shown in FIG. 2 can be combined and/or further partitioned to similarly limit the travel of the rack of the steering system 12 (FIG. 1). Inputs to the system can be sensed from the vehicle 10 (FIG. 1), received from other control modules (not shown), and/or determined/modeled by other sub-modules (not shown) within the control module 42. In various embodiments, the control module 42 includes a steering travel control module 102 and a travel datastore 104.

The travel datastore 104 stores one or more tables (e.g., lookup tables) that indicate an acceptable amount of travel of the steering assist unit 18 along a path of travel associated with the steering assist unit 18. In other words, the travel datastore 104 stores one or more tables that provide limits for the movement of the steering assist unit 18. In various embodiments, the tables can be interpolation tables that are defined by one or more indexes. A travel limit value provided by at least one of the tables indicates an amount of travel permitted by the steering assist unit 18. For example, the amount of travel may be an amount of travel of a rack of the steering assist unit 18. As a further example, one or more tables can be indexed by vehicle parameters such as, but not limited to, vehicle speed and wheel position, to provide the travel limit. Thus, the travel limit indicates an amount of travel permitted by the steering assist unit 18 based on a particular vehicle speed and wheel position.

The steering travel control module 102 receives as input vehicle speed data 106 from sensor 32 and wheel position data 108 from sensors 34, 36. The steering travel control module 102 generates a steering assist control signal 110 to the steering assist unit 18 based on the vehicle speed data 106 and wheel position data 108. In one example, the vehicle speed data 106 and wheel position data 108 are received and a travel limit value 112 is determined from the one or more tables of the travel datastore 104 based on the vehicle speed data 106 and wheel position data 108 (e.g., by performing a lookup function on the tables to determine a travel limit value using the vehicle speed and wheel position). The steering assist control signal 110 is generated to the steering assist unit 18 based on the vehicle speed data 106 and wheel position data 108 to control the travel of the steering assist unit 18 based on the current operation of the vehicle 10.

For example, at a predetermined vehicle speed, such as less than about 15 miles per hour (mph) the permitted travel limit for the steering assist unit 18 may be increased so long as the wheel position data 108 is within acceptable limits (i.e. the suspension system 38 is not at full rebound), as the slow movement of the vehicle 10 reduces a risk of collision between neighboring components of the steering system 12. The increased travel of the steering assist unit 18 thereby reduces the turning radius of the vehicle 10, which aids in parking the vehicle 10. If, however, the wheel position data indicates that one or more of the wheels 28, 30 are outside of acceptable limits, the travel limit of the steering assist unit 18 is not increased or decreased to prevent damage to the steering system 12. Thus, the control module 42 adapts the travel limits of the steering assist unit 18 based on the current operating conditions of the vehicle 10, which aids in the maneuverability of the vehicle 10, thereby increasing customer satisfaction. Generally, the acceptable travel limits depend on the proximity of neighboring components to the steering system 12. For example, the acceptable travel limits for the steering system 12 can range from about 86 millimeters (mm) to about 92 mm. In this example, if the wheel position data indicates that one or more of the wheels 28, 30 is experiencing jounce due to passing over an uneven surface, the travel limit for the steering system 12 can be reduced from about 92 mm to about 86 mm.

Figure 3:
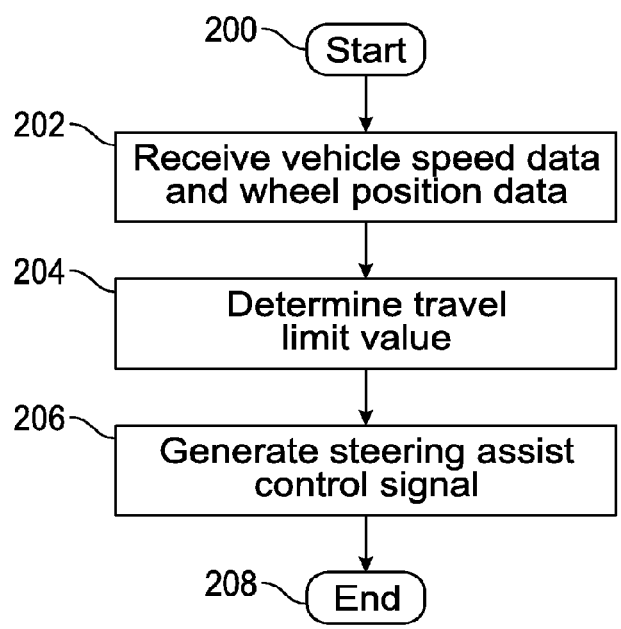
FIG. 3 is a flowchart illustrating a control method of the steering system in accordance with various embodiments.

Referring now to FIG. 3, and with continued reference to FIGS. 1 and 2, a flowchart illustrates a control method that can be performed by the control module 42 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method of FIG. 3 can be scheduled to run based on predetermined events, and/or can run continually during operation of the vehicle 10.

The method can begin at 200. At 202, the method receives the vehicle speed data 106 and wheel position data 108. The travel limit value 112 is determined from the tables of the travel datastore 104 based on the vehicle speed data 106 and wheel position data 108 at 204. The steering assist control signal 110 is generated based on the travel limit value 112 at 240. Thereafter, the method can end at 206.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a steering assist unit of a vehicle, comprising:
   receiving sensor data from a wheel position sensor associated with a magneto-rheological active shock of a suspension system of the vehicle indicating a wheel position of a wheel relative to a frame of the vehicle;
   determining a travel limit value for the steering assist unit based at least on the wheel position of the wheel; and outputting a control signal to control the travel of the steering assist unit based on the travel limit value.

2. The method of claim 1, wherein receiving sensor data further comprises:
receiving sensor data from a vehicle speed sensor indicating a speed of the vehicle.

3. The method of claim 2, further comprising:
determining the travel limit value for the steering assist unit based on the wheel position of the wheel and the speed of the vehicle.

4. The method of claim 3, wherein if the speed of the vehicle is above a predetermined speed, the travel limit value is different than a travel limit value if the speed of the vehicle is below the predetermined speed.

5. The method of claim 1, wherein the steering assist unit is an electric power steering assist unit.

6. A steering assist unit control system for a vehicle, the vehicle including a suspension system, the steering assist unit control system comprising:
a steering assist unit having a path of travel;
a wheel position sensor associated with a magneto-rheological active shock of the suspension system that indicates a wheel position of a wheel relative to a frame of the vehicle; and
a steering assist control module having a processor that determines a travel limit value for the steering assist unit based on a speed of the vehicle and the wheel position of the wheel of the vehicle.

7. The system of claim 6, wherein if the speed of the vehicle is above a predetermined speed, the travel limit value is different than a travel limit value if the speed of the vehicle is below the predetermined speed.

8. The system of claim 6, wherein the steering assist unit is an electric power steering assist unit.

9. A vehicle, comprising:
a suspension system associated with one or more wheels of the vehicle, the suspension system including a magneto-rheological active shock and a wheel position sensor associated with the magneto-rheological active shock that indicates a wheel position of a wheel relative to a frame of the vehicle;
a steering assist unit coupled to the wheels of the vehicle to move the wheels relative to the vehicle; and
a control module having a processor that determines a travel limit value for the steering assist unit based on the wheel position and a speed of the vehicle.

10. The vehicle of claim 9, wherein the steering assist unit includes a rack and a pinion, and the travel limit value is a limit for the travel of the rack of the steering assist unit.

11. The vehicle of claim 9, wherein if the speed of the vehicle is above a predetermined speed, the travel limit value is different than a travel limit value if the speed of the vehicle is below the predetermined speed.

* * * * *